United States Patent
Herel

(10) Patent No.: US 10,386,819 B2
(45) Date of Patent: Aug. 20, 2019

(54) METHOD FOR ADJUSTING A HANDLING MACHINE, AND CORRESPONDING HANDLING MACHINE

(71) Applicant: MANITOU BF, Ancenis (FR)

(72) Inventor: Jean-Philippe Herel, La Chapelle sur Erdre (FR)

(73) Assignee: MANITOU BF, Ancenis (FR)

( * ) Notice: Subject to any disclaimer, the term of this patent is extended or adjusted under 35 U.S.C. 154(b) by 651 days.

(21) Appl. No.: 14/759,038

(22) PCT Filed: Dec. 13, 2013

(86) PCT No.: PCT/FR2013/053061
§ 371 (c)(1),
(2) Date: Jul. 2, 2015

(87) PCT Pub. No.: WO2014/106700
PCT Pub. Date: Jul. 10, 2014

(65) Prior Publication Data
US 2015/0362915 A1 Dec. 17, 2015

(30) Foreign Application Priority Data
Jan. 3, 2013 (FR) .................................. 13 50032

(51) Int. Cl.
*G05B 15/00* (2006.01)
*G05B 19/416* (2006.01)
(Continued)

(52) U.S. Cl.
CPC .......... *G05B 19/416* (2013.01); *B66F 9/0655* (2013.01); *B66F 17/003* (2013.01);
(Continued)

(58) Field of Classification Search
CPC ................................. B66F 9/065; B66F 17/00
(Continued)

(56) References Cited

U.S. PATENT DOCUMENTS 3,704,551 A * 12/1972 Mueller .................. B24B 49/18
451/232
4,312,419 A * 1/1982 Noddings .............. B60K 31/08
180/177
(Continued)

FOREIGN PATENT DOCUMENTS

EP 0 343 839 A2 11/1989
EP 2 520 536 A1 11/2012

OTHER PUBLICATIONS

International Search Report, dated Mar. 6, 2014, from corresponding PCT application.
(Continued)

*Primary Examiner* — Mohammad Ali
*Assistant Examiner* — Sheela Rao
(74) *Attorney, Agent, or Firm* — IPSilon USA, LLP

(57) ABSTRACT

A method is provided for adjusting a handling machine (1) involves moving a control member (2) for controlling an actuator (7) or a motor (11) to adjust a maximum operating speed of the actuator (7) or motor (11) tool. The method includes memorizing a maximum speed setting in a suitable memory (4), and subjecting the work of the handling machine (1) to a control law, not exceeding the memorized maximum speed of operation. The method is applied of the adjustment method to a handling machine (1) including a plurality of actuators (7, 9, 11, 13, 15) and at least one actuator control member (2, 3).

11 Claims, 2 Drawing Sheets

(51) Int. Cl.
*B66F 9/065* (2006.01)
*B66F 17/00* (2006.01)
*G05B 15/02* (2006.01)

(52) U.S. Cl.
CPC .... *G05B 15/02* (2013.01); *G05B 2219/41091* (2013.01); *G05B 2219/43001* (2013.01)

(58) Field of Classification Search
USPC .................................. 700/279, 290; 425/150
See application file for complete search history.

(56) References Cited

U.S. PATENT DOCUMENTS

| | | | | |
|---|---|---|---|---|
| 4,942,529 A | * | 7/1990 | Avitan | ...................... B66F 9/24 340/685 |
| 2008/0018287 A1 | * | 1/2008 | Ogawa | ............... G05B 19/4061 318/652 |

OTHER PUBLICATIONS

FR Search Report, dated Oct. 10, 2013, from corresponding FR application.

* cited by examiner

METHOD FOR ADJUSTING A HANDLING MACHINE, AND CORRESPONDING HANDLING MACHINE

FIELD OF THE INVENTION

The invention relates to a method for adjusting the setup of a handling machine.

The invention also relates to a handling machine comprising a plurality of actuators and at least one actuator control member, able to implement a setup-adjustment method according to the invention.

DESCRIPTION OF THE RELATED ART

Turret-type rotating handlers, marketed by the company under French law Manitou BF, are known.

Such handling machines of the known type comprise a telescopic boom that can be inclined, and a rotary turret bearing the telescopic boom.

A working tool or an accessory for performing a specific task is generally mounted at the distal end of the telescopic boom.

These handling machines of known type comprise a driver's cab equipped with two control handles positioned one on each side of the armrests of the operator seat.

The control handles give control over all of the actuators of the handling machine, notably over the rotation of the turret by a rotary actuator, for example a hydraulic motor.

A first control handle allows the telescopic boom to be raised or lowered and allows the accessory or working tool to be inclined or lowered into a desired position. A second control handle allows the telescopic boom to be extended or the telescopic boom to be retracted, and also allows the turret to be rotated to the left or allows the turret to be rotated to the right.

An additional knob on one of the control members provides control over the work of a specific tool or working accessory by providing a source of hydraulic energy intended for a linear actuator or a rotary actuator that forms part of the working accessory or tool.

OBJECTS AND SUMMARY

A first object of the invention is to improve the adjustment of the setup of handling machines of known type as a function of the environment or of the accessory mounted on the handling machine.

A second object of the invention is to improve the operation of a handling machine by increasing the safety and stability of the machine by introducing specific control laws.

A subject of the invention is a method for adjusting the setup of a handling machine, comprising the following steps:
 a) moving a control member of an actuator or of a motor in order to set a maximum speed of operation of said actuator or motor;
 b) storing a maximum speed setting made in step a) in a suitable memory;
 c) forcing the work of the handling machine to follow a suitable control law by not exceeding the stored maximum operating speed or speeds.

According to other alternative features of the invention:
The memory storage of step b) is performed using a control member of an actuator or of a motor.
The suitable control law of step c) is defined as a function of an accessory or working tool of the handling machine.

Another subject of the invention is a handling machine comprising a plurality of actuators and at least one actuator control member, characterized in that at least one actuator control member can be moved into a setup-adjustment mode in order to set a maximum operating speed of an actuator so as to force the work of the handling machine to follow a suitable control law by not exceeding the set maximum operating speed or speeds.

According to other alternative features of the invention:
The handling machine comprises a memory means for storing the set operating speed(s) of the actuators.
An actuator control member bears a memory-storage member for storing a set actuator operating speed in said memory storage means.
The handling machine comprises a recognition means for recognizing a tool or working accessory of the handling machine.
The handling machine contains a means defining a suitable control law as a function of the recognition of a tool or working accessory performed by said recognition means.
The means defining a suitable control law and the memory-storage means are integrated into a computer of the control station of the handling machine.
The handling machine may comprise an orientable rotary turret driven by a rotary actuator, for example a hydraulic motor.

BRIEF DESCRIPTION OF THE DRAWINGS

The invention will be better understood from the description which will follow, given solely by way of nonlimiting example with reference to the attached drawings in which.

DETAILED DESCRIPTION

Figure 1:
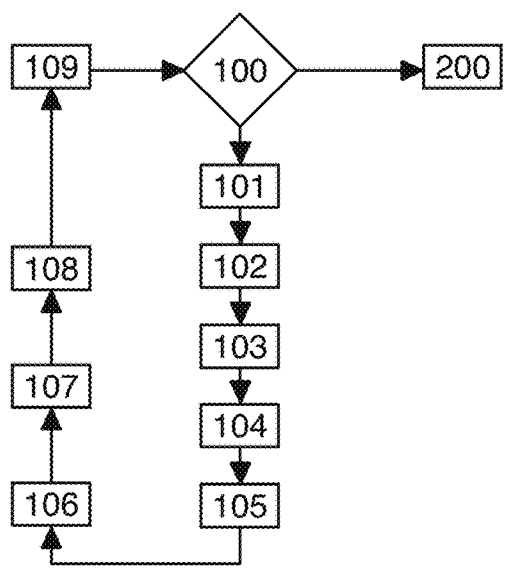
FIG. 1 is a schematic flow diagram representing the steps of a method for adjusting the setup of a handling machine according to the invention.

In FIG. 1, a method for adjusting the setup of a handling machine according to the invention comprises steps 100 to 109.

In step 100, the operator selects between a set-up working mode or a standard working mode.

If the operator chooses a standard working mode, in which the speed of the actuators may be equal to 100% of the nominal speed, the method continues to standard working mode step 200.

If the operator chooses to enter a setup-adjustment mode, the method continues to step 101 of setting the operation of the raising cylinder.

In step 101 the operator acts on the raising-cylinder control member in order to impose a maximum raising speed and a maximum lowering speed on the linear raising actuator.

Once this adjustment of the setup of the raising cylinder has been performed, the operator moves on to step 102 of adjusting the setting of the telescoping.

In step 102 the operator acts on the control member of the telescoping actuator in order to impose a maximum speed of extension of the telescope and a maximum speed of retraction of the telescope.

The operator then moves on to step 103 of adjusting the setup of the operation of the cylinder that inclines an accessory or a working tool.

In step 103 the operator acts on the control member of the inclination actuator in order to impose a maximum speed of forward inclination of the tool or working accessory and a maximum speed of rearward inclination of the tool or working accessory.

The operator then moves on to step 104 of adjusting the setup of a rotating turret bearing the telescopic boom of the handling machine according to the invention.

In step 104 the operator chooses a maximum speed at which the turret rotates to the right, and a maximum speed at which the turret rotates to the left.

The operator then moves on to step 105 of adjusting the setup of the working operation of an accessory or working tool.

In step 105 the operator sets the active mode of operation of the accessory or work tool and the set-down mode or inactive mode of operation of the accessory or working tool.

Having made the various desired speed adjustment settings, the operator in step 106 acknowledges the adjustment settings made by pressing an auxiliary member of a control member in order to store said maximum working speeds for the aforementioned actuators in memory.

In step 107 the operator connects with a tool or working accessory corresponding to the predetermined setup and the machine carries out a tool or working-accessory recognition using a tool or working-accessory-recognition means, for example using an RFID chip in order to recognize the nature of the accessory or working tool and check that it has been mounted correctly.

In step 108 the handling machine, having recognized the accessory or working tool, imposes a control law on the operation in order to perform work that has been set up, without exceeding the maximum actuator speeds set up in steps 101 to 105.

In step 109, the operator performs work in set-up mode, being forced to follow the control law integrated into the handling machine according to the invention.

The method for adjusting the setup of a handling machine according to the invention then loops back to the test step 100 of the setup-adjustment method according to the invention.

Figure 2:
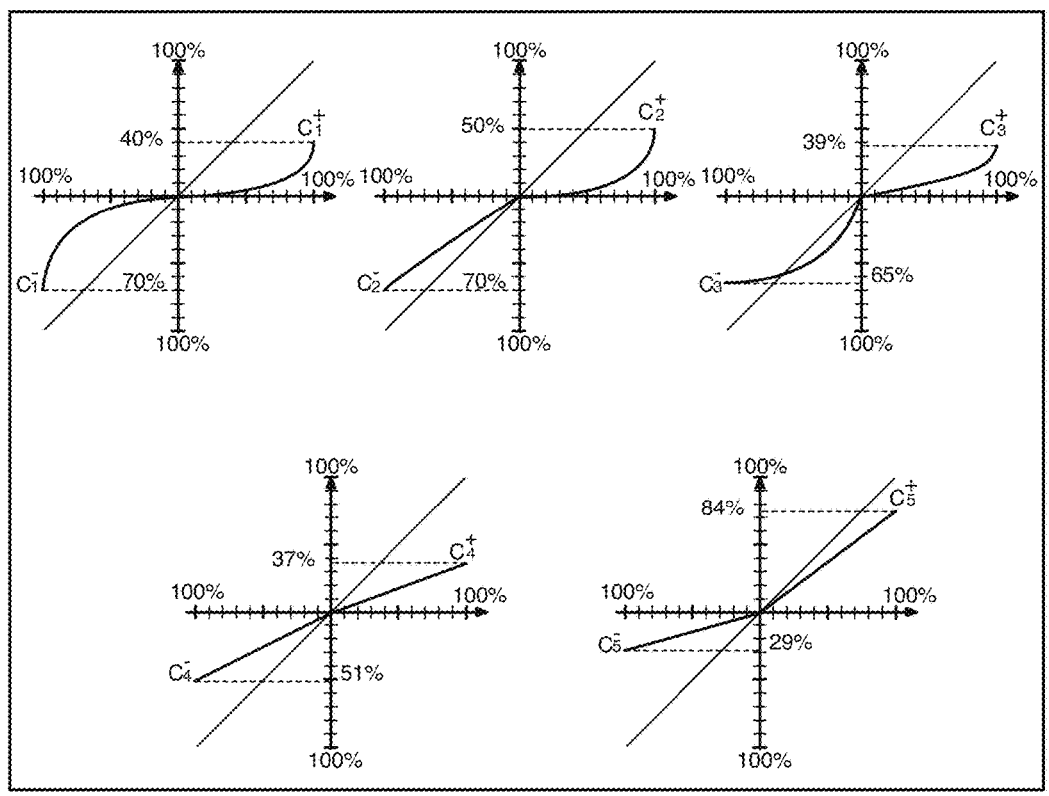
FIG. 2 is a schematic depiction of a plurality of control blocks illustrating the operation of the handling machine in the set-up working mode.

FIG. 2 depicts a collection of control laws by way of example, taking into consideration the maximum operating speeds set for various actuators of a handling machine according to the invention.

The collection of control laws is given for the functions of raising, telescoping, inclining, rotating the turret and operating an accessory or working tool of a handling machine according to the invention.

Curve C1+ is the control law for the raising of the telescopic boom at a maximum speed of 40% of the nominal raising speed.

Curve C1− is a control law for lowering the telescopic boom at a maximum speed of 70% of the nominal lowering speed.

Curve C2+ represents a control law for extending the telescope at a maximum extension speed of 50% of the nominal maximum telescope-extension speed.

Curve C2− represents a linear control law for retracting the telescope at a maximum speed of 70% of the nominal telescope-retraction speed.

Curve C3+ represents a control law for inclining a tool or working accessory forward at a maximum forward-inclination speed of 39% of the nominal speed.

Curve C3− represents a control law for inclining a tool or working accessory rearward at a maximum rearward-inclination speed of 65% of the nominal speed.

Curve C4+ represents a control law for the rotation of the turret to the right, with a maximum rightward turret rotation speed of 37% of the nominal speed.

Curve C4− represents a control law for the rotation of the turret to the left, with a maximum leftward turret rotation speed of 51% of the nominal speed.

Curve C5+ represents a control law for the setting-down or inactive operation of the accessory or working tool with a maximum speed of 84% of the nominal set-down or inactive-operation speed.

Curve C5− represents a control law for active operation of the accessory or working tool with a maximum speed of 29% of the nominal active-operation speed of the accessory or working tool.

Figure 3:
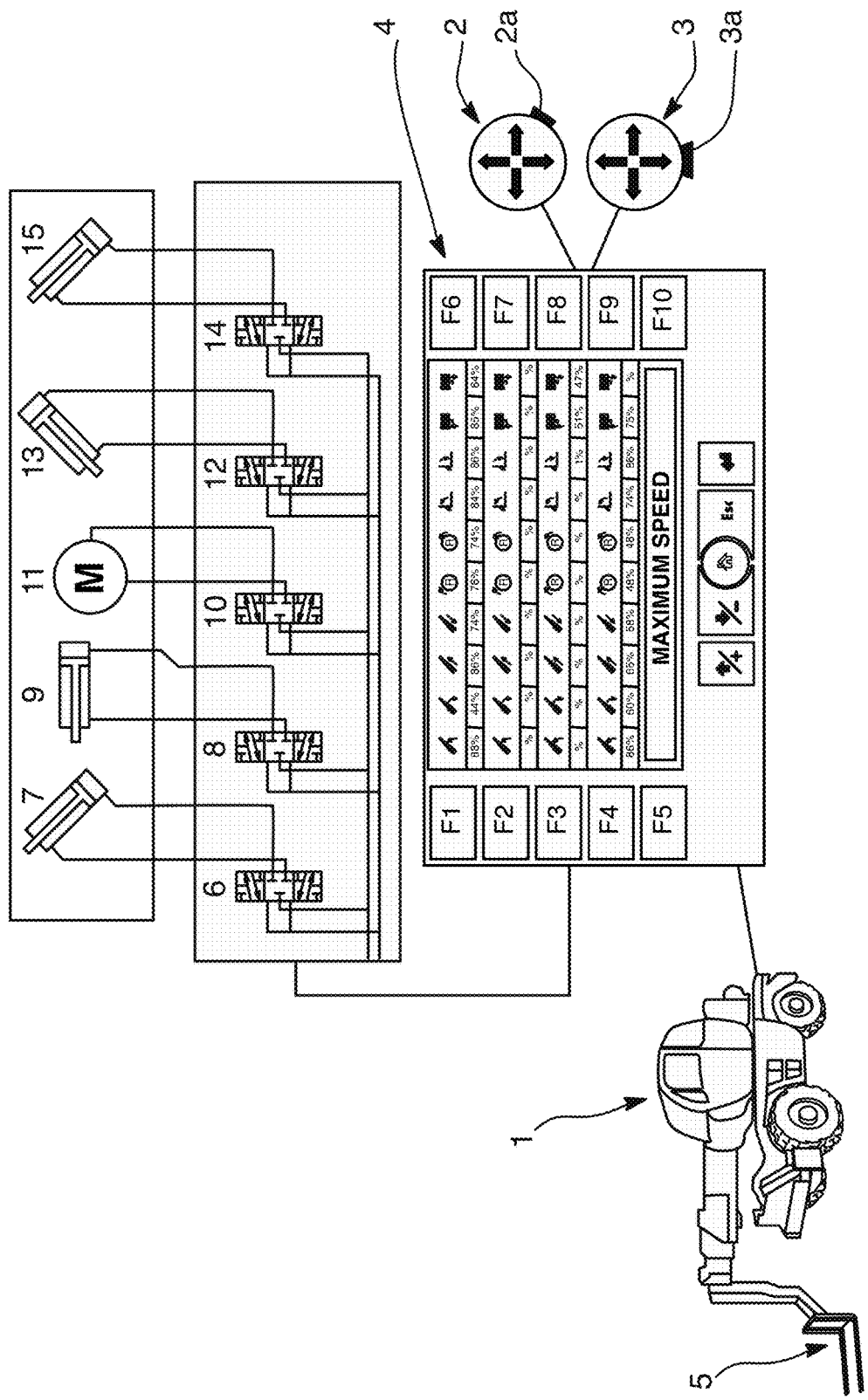
FIG. 3 schematically depicts a functional diagram of a handling machine according to the invention.

In FIG. 3, a handling machine identified in its entirety as (1) comprises a first control handle (2) for raising and lowering the telescopic boom and for inclining a tool or working accessory (5) forward or rearward.

The control handle (2) comprises an acknowledgment button (2a) for the memory-storage of the set speeds.

The handling machine (1) also comprises a control handle (3) for telescoping the telescopic boom and for rotating a turret to the left or to the right.

The control handle (3) bears a control knob (3a) for controlling the operation of the tool or accessory (5).

The tool or accessory (5) is recognized by suitable contactless recognition means, for example a contactless recognition system employing RFID technology.

Accessory recognition means that the safety parameters associated with the tool or working accessory (5), notably the loading charts therefor, can be taken into consideration automatically.

Recognition of the working tool or accessory (5) also makes it possible to check the control law and the maximum speeds set by the operator for work in set-up mode so as to force the work of the handling machine (1) not to exceed the set maximum operating speed or speeds.

The control handles (2) and (3) are connected to a computer (4) allowing either operation in standard working mode in which each actuator operates at 100% of its nominal working speed, or a set-up mode set up using the setup-adjustment method according to the invention.

To this end, the computer (4) comprises a display screen and ten function keys numbered F1 to F10.

In order to execute the series of one or more steps for adjusting the setup of the handling machine using a method of the type described with reference to FIG. 1, the operator executes setup-adjustment sequences.

The operator for example presses function F4 in order to select a computer display page.

The operator then chooses to set one or more actuator speeds by pressing for example one of the memories F6 to F9.

The operator for example presses the memory-selection key F6 and successively sets the parameters corresponding to the speeds in one direction or the other of an actuator dedicated to a specific function.

The F6 row records the settings made by the operator in succession for raising and lowering the telescopic boom, for extending the telescopic boom, for retracting the telescopic boom, for rotating the turret to the right, for rotating the turret to the left, for inclining the interface bearing the tool or working accessory rearward, for inclining the interface bearing the tool or working accessory forward, for operating with the tool or working accessory in the set-down position and for operating with the tool or working accessory in the active pick-up position.

If the operator does not wish to work in a set-up mode, he presses the key F10 which corresponds to the nominal speed for each actuator.

In order to store the set-up maximum values of the actuators in memory, the operator presses the button (2a) on the control handle (2).

As soon as the operator presses the button (2a) on the control handle (2), the set percentage of the maximum speed for the actuator in question in the direction in question is displayed under the corresponding icon on the memory row corresponding to the key F6.

In order to operate in a working mode that has been programmed according to the set control laws and set maximum speeds, all that is required is to press the associated work function key, for example the key F1 that allows work according to the sequence stored in the memory corresponding to the key F6.

The invention can be applied to any mode of operation and any kind of actuator of a handling machine.

In the particular example depicted, the actuators of the handling machine are hydraulic actuators.

The hydraulic actuator (7) is an actuator for raising or lowering the telescopic boom. The hydraulic actuator (7) is connected to a proportional electrohydraulic directional-control valve (6) connected to the computer (4).

The hydraulic actuator (9) is an actuator for extending or retracting the telescopic boom. The hydraulic actuator (9) is controlled by a proportional electrohydraulic directional-control valve (8) connected to the computer (4).

The turret motor (11) may be a hydraulic motor or an electric motor that allows the turret to be rotated in a desired direction, right or left, with total rotation. In the particular example, the turret motor (11) is a rotary hydraulic actuator (11) connected to a proportional hydraulic electrodirectional control valve (10) connected to the computer (4).

The hydraulic actuator (13) is an actuator for inclining the interface bearing a working accessory or tool (5). The hydraulic actuator (13) is connected to a proportional hydraulic electrodirectional control valve (12) connected to the computer (4).

The hydraulic actuator (15) operates the tool (5) or accessory in pick-up or set-down mode. The hydraulic actuator (15) is connected to a proportional hydraulic electrodirectional control valve (14) connected to the computer (4).

In the work mode with the maximum actuator speeds set up, the control laws are verified by the computer (4) and adapted to the tool (5) or working accessory recognized by the contactless recognition means causing collaboration between the interface and the working accessory or tool of the handling machine.

By way of example of a working accessory or tool, mention may be made of a pair of forks, a lifting beam, a winch, an augur, an endless-screw lifting tool, a loader bucket, a cutter, a handler bucket, a concrete bucket or any other system that can be mounted at the end of a telescopic boom or boom or tower of a handling machine.

Adjusting the maximum speeds of the actuators of the handling machine makes it possible to increase the precision and flexibility of maneuvers. Setting the maximum speeds of the actuator and forcing control laws to be followed are particularly beneficial when handling heavy or bulky loads or when working in confined spaces.

The simplest control laws may be linear laws. A linear law amounts to extending the scale of the control handle proportionally in order to associate the total travel of the control handle in the corresponding direction of actuation with the set maximum speed of the actuator.

In order to take specifics of the handling machine into consideration, particularly if there are movements which will impede stability or for the sake of machine safety, control laws may be non-linear, for example S-shaped or in the shape of an exponential curve or power curve analogous to the curves supplied by PID control or curves representative of the discharging of a capacitor.

Automating the setting-up of a working accessory or tool and doing so for a particular task in question makes it possible to improve safety and limit operational errors of the handling machine.

When working in a confined space, control laws may be combined in order to avoid obstacles being neared too quickly or in order to avoid positions that are critical to the stability of the handling machine.

The invention described with reference to one particular embodiment is not in any way restricted thereto but on the contrary covers any modification in form and any alternative form of embodiment that fall within the scope and spirit of the invention.

The invention is particularly applicable to trucks with telescopic booms of the usual type, but which do not have a rotary turret.

The invention can also be applied to industrial tower trucks, and any type of all-terrain handling truck, as well as being applicable to lifting platforms.

The invention finally applies to any mode of operation or any kind of actuator of a handling machine, notably electric, electrohydraulic or other types of actuator.

The invention claimed is:

1. A method for adjusting the setup of a handling machine, said handling machine having a standard mode and a set-up adjustment mode, and a plurality of actuators and at least one actuator control member, said adjusting by a handling machine operator comprising the following steps:
   a) said handling machine operator initiating said set-up adjustment mode and moving said actuator control member into a setup-adjustment mode in order to set a maximum operating speed of an actuator so as to adjust the work output of the handling machine to follow the control law by not exceeding the set maximum operating speed or speeds, said control member being the same control member that actuates said actuator or motor when in said standard mode;
   b) storing a maximum speed setting made in step a) in a memory, said memory integrated into a computer of a control station of the handling machine;
   c) said operator returning said handling machine to said standard mode; and
   d) in said standard mode, said control station adjusting a work output of the handling machine when said operator is actuating said actuator or motor in said standard mode using said control member, to operate within the parameters of a control law, said adjustment including said handling machine not exceeding the stored maximum operating speed or speeds set by said operator in said set-up adjustment mode using the same control member.

2. The method as claimed in claim 1, wherein the memory storage of step b) is performed using a control member of an actuator or of a motor.

3. The method as claimed in claim 2, wherein the control law of step c) is defined as a function of an accessory or working tool of the handling machine.

4. The method as claimed in claim 1, wherein the control law of step c) is defined as a function of an accessory or working tool of the handling machine.

5. The machine as claimed in claim 1, wherein the handling machine comprises a memory means for storing the set operating speed(s) of the actuators.

6. The machine as claimed in claim 5, wherein an actuator control member bears a memory-storage member for storing a set actuator operating speed in said memory storage means.

7. The machine as claimed in claim 1, wherein an actuator control member bears a memory-storage member for storing a set actuator operating speed in said memory storage means.

8. The machine as claimed in claim 1, wherein the handling machine comprises a recognition means for recognizing a tool or working accessory of the handling machine.

9. The machine as claimed in claim 8, wherein the handling machine contains a means defining the control law as a function of the recognition of a tool or working accessory performed by said recognition means.

10. The machine as claimed in claim 1, wherein the handling machine comprises an orientable rotary turret driven by a rotary actuator.

11. A handling machine for implementing the method as claimed in claim 2, comprising a plurality of actuators and at least one actuator control member, wherein at least one actuator control member can be moved into a setup-adjustment mode in order to set a maximum operating speed of an actuator so as to adjust the work output of the handling machine to follow the control law by not exceeding the set maximum operating speed or speeds.

* * * * *